UNITED STATES PATENT OFFICE.

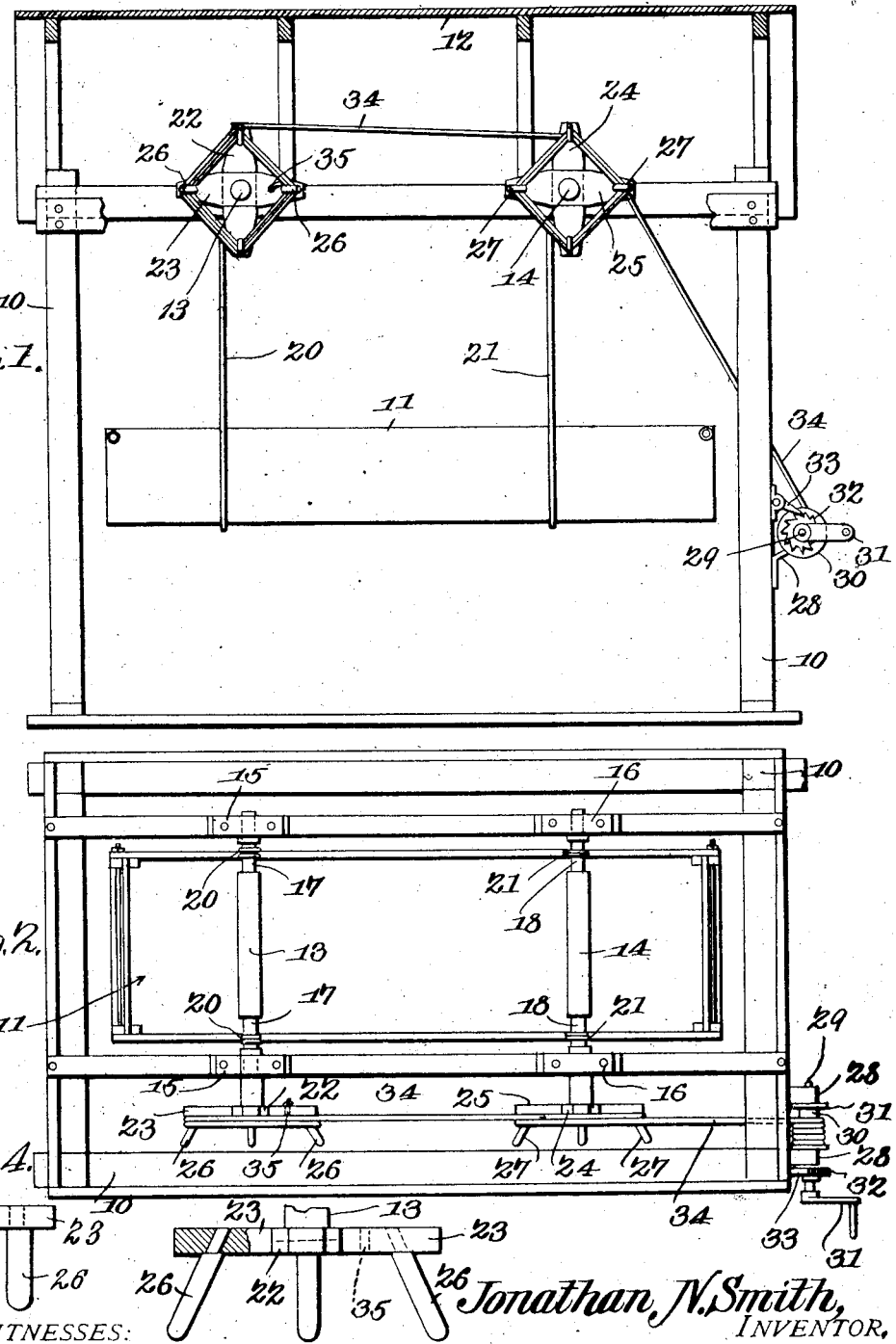

JONATHAN N. SMITH, OF GILMER, TEXAS.

WAGON-BODY LIFTER.

No. 834,169.　　　　Specification of Letters Patent.　　　　Patented Oct. 23, 1906.

Application filed March 8, 1906. Serial No. 304,984.

*To all whom it may concern:*

Be it known that I, JONATHAN N. SMITH, a citizen of the United States, residing at Gilmer, in the county of Upshur and State of Texas, have invented a new and useful Wagon-Body Lifter, of which the following is a specification.

This invention relates to apparatus for removing the boxes or bodies from wagon running-gears and replacing the same and for similar purposes, and has for its object to improve the construction and increase the efficiency of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

Figure 1 is a side elevation with a portion of the frame removed. Fig. 2 is a plan view with the roof or shelter removed. Fig. 3 is an enlarged view, partly in section, of one of the operating drums or reels. Fig. 4 is an enlarged detail view of one of the operating-drums, illustrating a slight modification in the construction.

The improved device comprises a supporting-frame 10, wide enough to permit a wagon to be driven through it, long enough to receive the body portion of the wagon, and high enough to permit the body or box of the wagon (represented at 11) to be elevated to permit the wagon running-gear to be drawn from beneath it. A roof or shelter 12 is also supplied to the frame to protect the box when the latter is disposed therein. Mounted for rotation upon the framework 10 are two shafts 13 14, preferably formed from a square timber, rounded where the bearings 15 16 occur and with other rounded portions at 17 18 to form winding-drums for the cables 20 21, by which the box 11 is elevated. The cables 20 21 are connected at the ends to the drum portions of the shafts 13 14 and depend in loops therefrom for bearing beneath the box 11. The shafts 13 14 are extended at one end and provided with reversely-disposed arms 22 23 and 24 25, the arms being disposed at right angles to each other and "halved" together, as represented more clearly in Fig. 3. The right-angled arms 22 23 are provided with inclined pins 26, and the arms 24 25 are provided with correspondingly-inclined pins 27. Mounted in brackets 28 upon the frame 10 at a convenient distance above the ground is a shaft 29, carrying a winding-drum 30, a crank 31, and a ratchet-wheel 32, the latter engaged by a pawl 33. A cable 34 is connected at one end to the drum 30 and leads thence one or more times around the reel of inclined pegs 27, and thence one or more times around the reel of inclined pegs 26 and connected at the other end, as at 35, to the reel. By this arrangement when a wagon is driven beneath the shafts 13 14 and the bight of the cables 20 21 placed beneath the wagon-body 11 near the ends and the crank 31 operated the cable 34 will be unwound from the reels simultaneously and simultaneously wind up the cables 20 21 on the drum portions 17 18 of the shafts 13 14, and thus elevate the box 11, the ratchet 32 and pawl 33 operating to hold the box at any required elevation. This arrangement of the cable 34 upon the reels assures the simultaneous action of the same and of the shafts 13 14, so that both ends of the box are elevated at the same time.

When the box is to be lowered, the pawl 33 is released and the box permitted to descend by gravity, the speed being controlled by backward pressure upon the crank 31.

The device is simple in construction, can be inexpensively manufactured, and operates efficiently for the purposes described.

The pins 26 may be disposed at right angles to the arms 22 23, as indicated in Fig. 4, if preferred.

Having thus described the invention, what is claimed is—

In an apparatus of the class described, a supporting-frame, two shafts spaced apart and mounted for rotation upon said frame, flexible loops depending from said shafts, arms extending radially from said shafts, a pin extending from each of said arms and spaced at uniform distances from said shafts and inclined to the longitudinal plane of the same, a cable connected at one end to one of the arms of one of said shafts and wound one or more times around the adjacent inclined pins and thence wound one or more times around the inclined pins associated with the other shaft, and draft means applied to said cable.

In testimony that I claim the foregoing as my own I have hereto affixed my signature in the presence of two witnesses.

JONATHAN N. SMITH.

Witnesses:
W. W. SANDERS,
A. F. SHEPPURD,